(12) United States Patent
Tanaka

(10) Patent No.: US 8,002,239 B2
(45) Date of Patent: Aug. 23, 2011

(54) VALVE DEVICE

(75) Inventor: Mamoru Tanaka, Osaka (JP)

(73) Assignee: Chiyoda Kuchokiki Co., Ltd., Osaka (JP)

( * ) Notice: Subject to any disclaimer, the term of this patent is extended or adjusted under 35 U.S.C. 154(b) by 705 days.

(21) Appl. No.: 12/086,636

(22) PCT Filed: Feb. 21, 2008

(86) PCT No.: PCT/JP2008/053581
§ 371 (c)(1),
(2), (4) Date: Jun. 17, 2008

(87) PCT Pub. No.: WO2008/142891
PCT Pub. Date: Nov. 27, 2008

(65) Prior Publication Data
US 2010/0276622 A1   Nov. 4, 2010

(30) Foreign Application Priority Data
May 22, 2007   (JP) ................................ 2007-135110

(51) Int. Cl.
*F16K 27/02* (2006.01)
(52) U.S. Cl. ..................... 251/216; 251/291; 251/367
(58) Field of Classification Search ............... 251/90–93, 251/215–216, 291, 366–367
See application file for complete search history.

(56) References Cited

U.S. PATENT DOCUMENTS

| | | | | |
|---|---|---|---|---|
| 3,934,426 A | * | 1/1976 | Jespersen et al. | 62/205 |
| 5,507,315 A | * | 4/1996 | Parker | 137/625.43 |
| 5,626,030 A | * | 5/1997 | Nagai | 137/599.11 |

FOREIGN PATENT DOCUMENTS

| | | |
|---|---|---|
| JP | 46-86991 | 6/1973 |
| JP | 49-35028 | 10/1975 |
| JP | 56-138709 | 3/1983 |
| JP | 5-180361 A | 7/1993 |
| JP | 7-332533 A | 12/1995 |
| JP | 2000-88127 A | 3/2000 |
| JP | 2000-161517 | 6/2000 |

* cited by examiner

*Primary Examiner* — John Bastianelli
(74) *Attorney, Agent, or Firm* — Bacon & Thomas, PLLC

(57) ABSTRACT

A valve body 3 is provided at its one side with a part for receiving an operation tool which turns a valve spindle, the valve body further provided at the other side with a part for mounting a connection tool 8 by which an external piping is attached and detached, and the valve body 3 moreover provided at the middle with a part 33 having a non-round cross section and a part 34 concaved from the outside surface of the part 33. A support member 4 consists of an engaging section 43 which engages with the part 33 to restrict or prevent the valve body 3 from turning and shifting in position, and an engaging section 44 which engages with the part 34 to restrict or prevent the valve body 3 from axially shifting in position.

8 Claims, 20 Drawing Sheets

[1 − A] Liquid-side valve being closed (before installation)

[1 − B] Liquid-side valve being opened (after installation)

[2 — A] Gas-side valve being closed (before installation)

[2-B] Gas-side valve being opened (after installation)

1

VALVE DEVICE

FIELD OF THE INVENTION

The present invention relates to a valve device which is mounted to an outdoor unit of an air conditioner and in which, upon installation or removal of the air conditioner, an external piping extending from an indoor unit of the air conditioner is attached to or detached from the valve device by use of a connection tool, such as a flare nut, etc, and a refrigerant passage is opened and closed with a valve spindle inside the valve body.

BACKGROUND OF THE INVENTION

Conventionally, as disclosed in the patent document 1, etc, the valve body forming an outer frame case of this kind of valve device is provided with a cylindrical trunk part having a receiving part for an operation tool which moves forward and backward a valve spindle inside the valve body, a pair of support legs integrally provided at the lower part of the trunk part and tightened by screws to an outdoor unit frame, etc, and a connection tool mounting part which is integrally provided in the lateral direction of the trunk part and to which a connection tool such as flare nut is tightened, those parts first subjected to forging process, followed by forming.

Patent document 1: Japanese Unexamined Utility Model Application 57-143480 official gazette However, the patent document 1 provides integrally the support legs to the trunk part and requires the forging process, so that the weight and cost increases. And the axis of the valve spindle and that of flare nut intersect at right angles. In case that the flare nut is tightened strongly, strain or distortion of material for the valve body causes deterioration or incorrectness of circularity at the part of a seat (with which the tip of the valve spindle is to be contacted), or, slanting of the axis of valve spindle from standard verticality or the like, whereby there is a fear that refrigerant gas gradually leaks to the outside after installation, or, it is hard to keep a perfect tightly sealed state even when the valve spindle is positioned to the closing side again upon removal.

To improve the art in the foregoing circumstances, the technology of a service valve for a compressor disclosed in the patent document 2 may be converted, so that the support legs with respect to the outdoor unit frame, etc are integrally provided, not at the lower part of the trunk of the valve body, but to the left and right-hand sides of a middle part of the trunk in such manner of wings being stretched. And a connection tool mounting part for an external piping is provided at the lower part of the trunk. By this, the axis of the valve spindle and that of flare nut are arranged coaxially.

Patent document 2: Japanese Unexamined Utility Model Application 61-75569 official gazette Even when the improvement is made, since the support legs are integrally provided to the trunk part, the problem of the increase of weight and cost is left as it is. In addition thereto, when and after the valve body is screwed to the outdoor unit frame, additional strain or distortion is caused by a foreign force applied to the support legs projecting at the left and right-hand sides of the trunk like a cantilever, resulting in a fear of refrigerant leakage caused by the additional strain or distortion.

DETAILED DESCRIPTION OF THE INVENTION

An object of the present invention is to provide a valve device which is lightweight and manufactured at low cost, while being fully reliable as limits to the minimum an influence of strain or distortion of a valve body arising from connection of external piping and the supporting of the valve to the outdoor unit frame or the like, and lowers and reduces leakage of refrigerant as much as possible.

A means to achieve the object will be referred to using parenthesized reference numerals for component factors exemplified in the drawings. A valve device comprising: a valve spindle (1) to be moved forward and backward by a turning operation; a valve body (3) in a cylindrical shape being provided inside with a passage (7) for refrigerant which passage is to be opened and closed by forward and backward movement of the valve spindle (1); and a support member (4) for supporting the valve body (3), wherein the valve body (3) is provided at its one side in the axial direction of the cylindrical shape with an operation tool receiving part (31) for receiving the operation tool which turns the valve spindle (1), the valve body further provided at the other side in the axial direction with a connection tool mounting part (32) for mounting a connection tool (8) by which an external piping (2) is attached and detached;

between the operation tool receiving part (31) and the connection tool mounting part (32) of the valve body (3) are provided a non-round trunk part (33) having a cross-section of a non-round shape, and a recessed part (34) concaved from the outside surface of the trunk part (33); and the support member (4) consists of a trunk part engaging section (43), which engages with the non-round trunk part (33) to restrict or prevent the valve body (3) from turning and shifting in position, and a recessed part engaging section (44) which engages with the recessed part (34) to restrict or prevent the valve body (3) from axially shifting in position. The "external piping" (2) means a piping extending from other equipments such as an indoor unit, etc which is an outside component with respect to the equipments such as an outdoor unit, etc to which the valve device is mounted.

The recessed part (34) does, preferably, comprise an annular groove (340) which has a groove bottom (341) equidistant from the axis of the cylindrical shape of the valve body (3) and a pair of groove side walls (342, 343) extending inwardly from the outside surface of the non-round trunk part (33).

Another means to achieve the foregoing object will be referred to. A valve device comprising: a valve spindle (1) to be moved forward and backward by a turning operation; a valve body (3) in a cylindrical shape being provided inside with a passage (7) for refrigerant which passage is to be opened and closed by forward and backward movement of the valve spindle (1); and a support member (4) for supporting the valve body (3), wherein the valve body (3) is provided at its one side in the axial direction of the cylindrical shape with an operation tool receiving part (31) for receiving the operation tool which turns the valve spindle (1), the valve body further provided at the other side in the axial direction with a connection tool mounting part (32) for mounting a connection tool (8) by which an external piping (2) is attached and detached;

between the operation tool receiving part (31) and the connection tool mounting part (32) of the valve body (3) are provided a non-round trunk part (33) having a cross-section of a non-round shape, and a projecting part (50) projecting from the outside surface of the trunk part (33); and the support member (4) consists of a trunk part engaging section (43), which engages with the non-round trunk part (31) to restrict or prevent the valve body (3) from turning and shifting in position, and a projecting part engaging section (45) which engages with the projecting part (50) to restrict or prevent the valve body (3) from axially shifting in position.

The projecting part (50) does preferably comprise an internal piping (5) fixed laterally to the non-round trunk part (33), and the projecting part engaging section (45) comprises a piping holder (450) which contacts with the outer periphery of the internal piping (5). The internal piping (5) means a piping to be provided inside the equipments such as an outdoor unit, etc to which the valve device is mounted.

The valve body 3 is further preferably made of a cut or precut work from a bar-shaped member or material.

According to the foregoing first-mentioned means to achieve the object of the invention, the valve body (3) is provided at its one side in the axial direction of the cylindrical shape with the operation tool receiving part (31) for receiving the operation tool which turns the valve spindle (1), the valve body further provided at the other side in the axial direction with the connection tool mounting part (32) for mounting a connection tool (8) by which the external piping (2) is attached and detached. Thus, the axis of the valve spindle (1) and that of the connection tool mounting part (32) can be arranged coaxially, whereby influence of strain or distortion of the valve body (3) caused by connection of the external piping (2), namely, deterioration or incorrectness of circularity at the part of a seat (with which the tip of the valve spindle (1) is to be contacted), or, slanting of the axis of valve spindle (1) from standard verticality, or the like, can be eliminated as much as possible. In addition, the valve body (3) is not integrally provided with the conventional type of support legs, so that the weight and cost can be lowered and reduced while the supporting of the valve body (3) to the support member (4) can be effectively carried out through engagement between the non-round trunk part (33) and the trunk part engaging section (43) and that between the recessed part (34) and the recessed part engaging section (44) in the state that the valve body (3) is restricted or prevented from turning and shifting in position and axially shifting in position. As a result, influence of strain or distortion arising from the supporting of the valve body (3) is also eliminated as much as possible. Hence, making lightweight and low cost can be realized while leakage of refrigerant can be lowered and reduced as much as possible, and high reliability can be ensured.

In case of forming the recessed part (34) by use of an annular groove (340), the annular groove (340) can be readily worked and provided by use of a lathe or the like by turning the valve body (3) around the axis of the cylindrical shape. Moreover, between a pair of groove side walls (342, 343) of the annular groove (340), the recessed part engaging section (44) can be engaged, so that the valve body (3) can be effectively restricted or prevented from axially shifting in position, particularly, in axial both directions.

According to the foregoing another means to achieve the object of the invention, the valve body (3) is provided at its one side in the axial direction of the cylindrical shape with the operation tool receiving part (31) for receiving the operation tool which turns the valve spindle (1), the valve body further provided at the other side in the axial direction with the connection tool mounting part (32) for mounting the connection tool (8) by which the external piping (2) is attached and detached. Thus, the axis of the valve spindle (1) and that of the connection tool mounting part (32) can be arranged coaxially, whereby influence of strain or distortion of the valve body (3) caused by connection of the external piping (2), namely, deterioration or incorrectness of circularity at the part of a seat (with which the tip of the valve spindle (1) is to be contacted), or, slanting of the axis of valve spindle (1) from standard verticality, or the like, can be eliminated as much as possible. In addition, the valve body (3) is not integrally provided with the conventional type of support legs, so that the weight and cost can be lowered and reduced while the supporting of the valve body (3) to the support member (4) can be effectively carried out through engagement between the non-round trunk part (33) and the trunk part engaging section (43) and that between the projecting part (50) and the projecting part engaging section (45) in the state that the valve body (3) is restricted or prevented from turning and shifting in position and axially shifting in position. As a result, influence of strain or distortion arising from the supporting of the valve body (3) is also eliminated as much as possible. Hence, making lightweight and low cost can be realized while leakage of refrigerant can be lowered and reduced as much as possible, and high reliability can be ensured.

In case of forming the projecting part (50) by use of the internal piping (5), the projecting part (50) can be provided at a lowest cost. And since the piping holder (450) forming the projecting part engaging section (45) contacts with the outer periphery of the internal piping (5), the supporting of the whole of the valve body (3) including the internal piping (5) can be excellently carried out.

In case of forming the valve body (3) by use of a cut or precut work from a bar-shaped member or material, the bar-shaped member may be turned so that the operation tool receiving part (31) and the connection tool mounting part (32) can be formed on the same axis coaxially readily by using a lathe or the like. Further, the bar-shaped member may employ a rectangular material, so that the non-round trunk part (33) can be provided by use of the rectangular material in a manner of almost working-less, thereby enabling completion of making low cost.

PREFERRED EMBODIMENTS OF THE INVENTION

Figure 1:
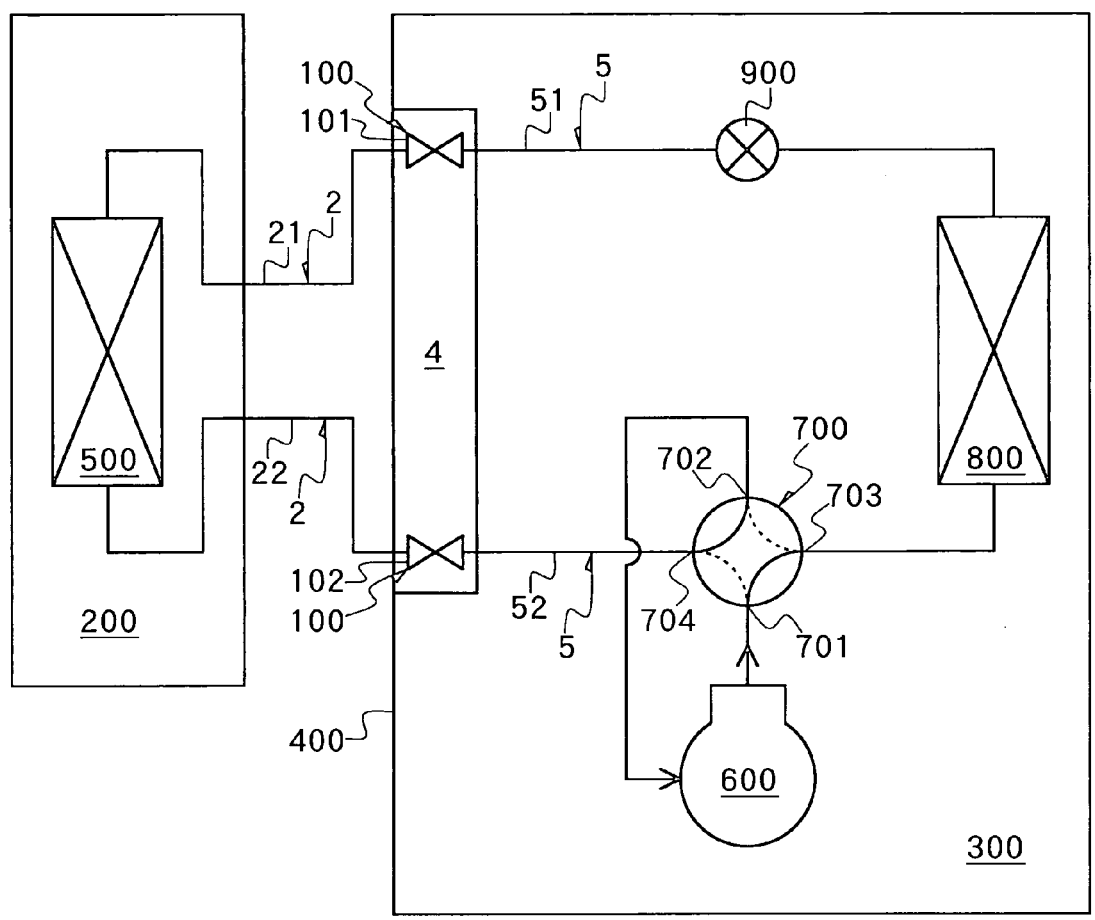
FIG. 1 is a refrigerant circuit diagram of an air conditioner to which the valve device according to the present invention is applied.

As shown in FIG. 1, a valve device 100 according to the present invention connects a pair of external piping 2 (consisting of a liquid-side piping 21 and a gas-side piping 22 each extending from an indoor unit 200) to an outdoor unit 300. The valve device 100 comprises a liquid-side valve 101 and a gas-side valve 102 each supported to a supporting member 4 fixed to a frame 400 of the outdoor unit.

The indoor unit 200 has an indoor unit-side heat exchanger 500 which serves as an evaporator upon cooling the room and as a condenser upon warming the room. The outdoor unit 300 has a compressor 600; a four way switch valve 700 for switching cooling and warming which comprises a pair of fixed ports 701, 702 and a pair of switching ports 703, 704; an outdoor unit-side heat exchanger 800 which serves as a condenser upon cooling the room and as an evaporator upon warming the room; and an expansion valve 900. An internal piping 5 comprising a liquid piping 51 connects between the liquid-side valve 101 and the expansion valve 900, and an internal piping 5 comprising a gas piping 52 connects between the gas-side valve 102 and the four way switch valve 700.

Figure 2:
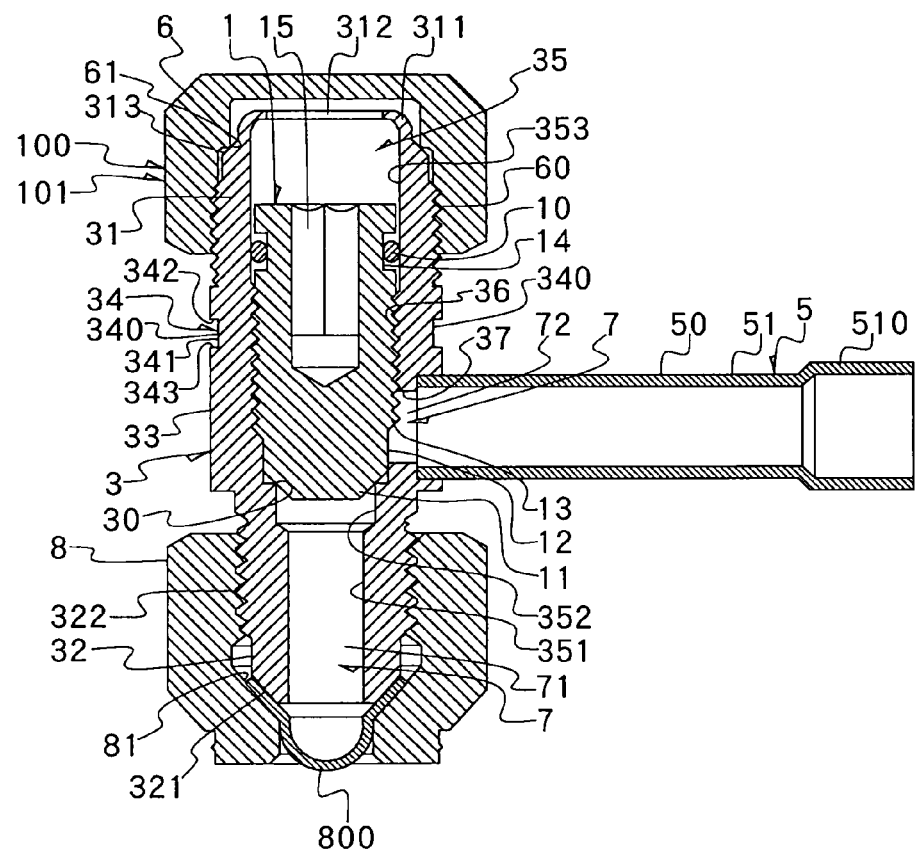
FIG. 2 is a sectional view of a liquid-side valve in the state of being closed.

As shown in FIG. 2, a valve body 3 of the liquid-side valve 101 has an appearance in the slightly smaller pencil-shaped form. A valve spindle 1 housed in the valve body 3 is formed with a cut or precut work from a rod-shaped member or material having a round cross section made of a round bar material such as brass or aluminum. The valve spindle 1 has a truncated conical valve head 11 at the tip which is seated on and shifts away from a circular valve seat 30 of the valve body 3; a cylindrical part 12 in continuation to the valve head 11; a male screw-thread part 13 to mesh with a female screw-thread part 36 formed on a shaft hole 35 of the valve body 3; a ring groove 14 into which a seal ring 10 made of an O-ring is fit; and an operation hole 15 made of a hexagonal hole into which an operation tool such as a hexagonal wrench, etc is inserted.

The valve body 3 is formed with a cut or precut work from a rod-shaped member or material having a non-round cross section made of a rectangular bar material such as brass or aluminum. The valve body 3 is formed in a cylindrical shape as a whole. The valve body 3 is provided, at one side in the axial direction of the cylindrical shape, with a receiving part 31 for receiving an operation tool such as a hexagonal wrench, etc in the state that a valve lid 6 to be tightened to the valve body 3 with a screw-thread 60 is disconnected. The operation tool receiving part 31 has a wider receiving hole 312 which is opened inwardly of a bent part 311 (which is provided at the rear end of the valve body 3 for preventing the valve spindle 1 from falling). The valve lid 6 is press-fit, at its annular edge 61 formed inside, against an annular tapered surface part 313 formed at the root of the fall-preventing bent part 311, so that the valve spindle 1 is sealed double at its operation-end side.

The valve spindle 3 is provided, at the other end in the axial direction of the cylindrical shape, with a connection tool mounting part 32 for mounting a connection tool 8 consisting of a flare nut. The connection tool mounting part 32 is provided with a tapered surface part 321 facing an inside flare 81 of the connection tool 8, and also with a screw-thread part 322 to mesh with the connection tool 8. An axis of the screw-thread 322 of the connection tool mounting part 32 is coaxial to that of the shaft hole 35, in turn, to those of the valve spindle 1 and a valve seat 30. Before connection, namely, installation of the external piping, a flare cap 800 is held between the tapered surface part 321 and the inside flare 81 to protect the inside.

A non-round trunk part 33 having a non-round cross sectional shape is provided, on the middle part in the axial direction located between the operation tool receiving part 31 and the connection tool mounting part 32 of the valve body 3, by making use of the non-round cross section of the bar-shaped member as it is. The non-round trunk part 33 has a cross section in the shape of an equilateral hexagon on the basis of the specific work stuff, i.e., the rectangular bar material having equilateral hexagonal cross section. Otherwise, the work stuffs may be selectively chosen to provide such cross sections in the shapes as of an equilateral quadrangle; in a D-like shape having a linear cut part provided peripherally partially; in a barrel-like shape having two linear cut parts each provided peripherally and opposing to each other, etc. Fixed to laterally of the non-round trunk part 33 by means of brazing or the like is a pipe joint 510 which is a component part for a liquid piping 51 serving as the internal piping 5.

The non-round trunk part 33 is provided with a recessed part 34 recessed from the outside surface of the trunk part 33 at a point slightly upwards of the point of fixing the pipe joint 510. The recessed part 34 comprises an annular groove 340 which has a groove bottom 341 equidistant from the axis of the cylindrical-shaped valve body 3 and a pair of groove side walls 342, 343 each extending inwards from the outside surfaces (in different height) of the non-round trunk part 33. The recessed part 34 is formed by a rotary cutting process using a lathe, etc.

The shaft hole 35 of the valve body 3 does stepwise have: a small diameter longitudinal hole 351 constituting an external piping-side passage 71 of a refrigerant passage 7; a middle diameter longitudinal hole 352 in continuation to the small diameter longitudinal hole 351; and a large diameter longitudinal hole 353 provided with a female screw-thread part 36, so that it is enabled to work holes unidirectionally from the side of the operation tool receiving part 31. At the side of the large diameter longitudinal hole 353 with respect to the valve seat 30, a lateral hole 37 constituting an internal piping-side passage 72 of the refrigerant passage 7 is opened to communicate with the pipe joint 510.

Figure 3:
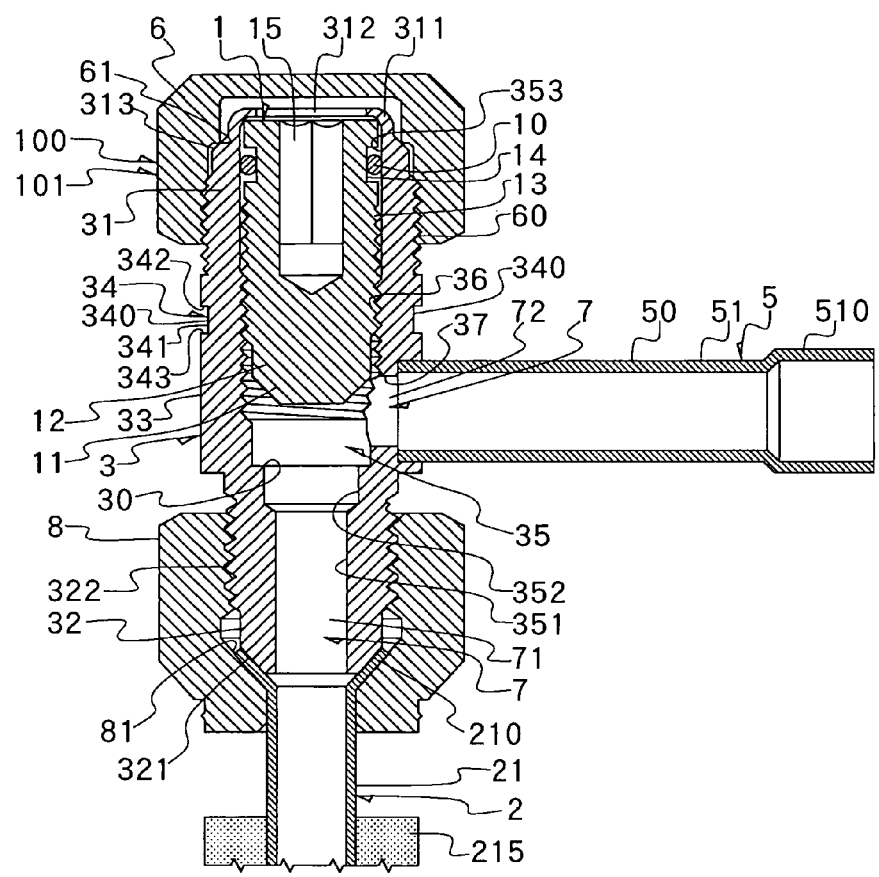
FIG. 3 is a sectional view of a liquid-side valve in the state of being opened.

As shown in FIG. 3, after installation, onto the tapered surface part 321 of the connection tool mounting part 32 is press-contact a flare part 210 of a liquid-side piping 21 serving as an external piping 2. In this case, since the axis of the connection tool 8 and that of the valve spindle 1 are coaxial, so that even when the connection tool 8 is highly tightened, such fears are lowered and reduced that circularity or roundness of the round valve seat 30 becomes deteriorated or incorrect or the axis of the valve spindle 1 is deviated or slanted from standard verticality. The valve lid 6 is removed and the valve spindle 1 is turned by means of the operation tool such as hexagonal wrench or the like to move up the valve spindle 1 until the same abuts against the fall prevention bent part 311, so that the valve head part 11 at the tip is fully moved away from the valve seat 30, whereby allowing the external piping-side passage 71 to communicate with the internal piping-side passage 72. Reference numeral 215 denotes a heat insulating material wound onto the liquid-side piping 21.

Figure 4:
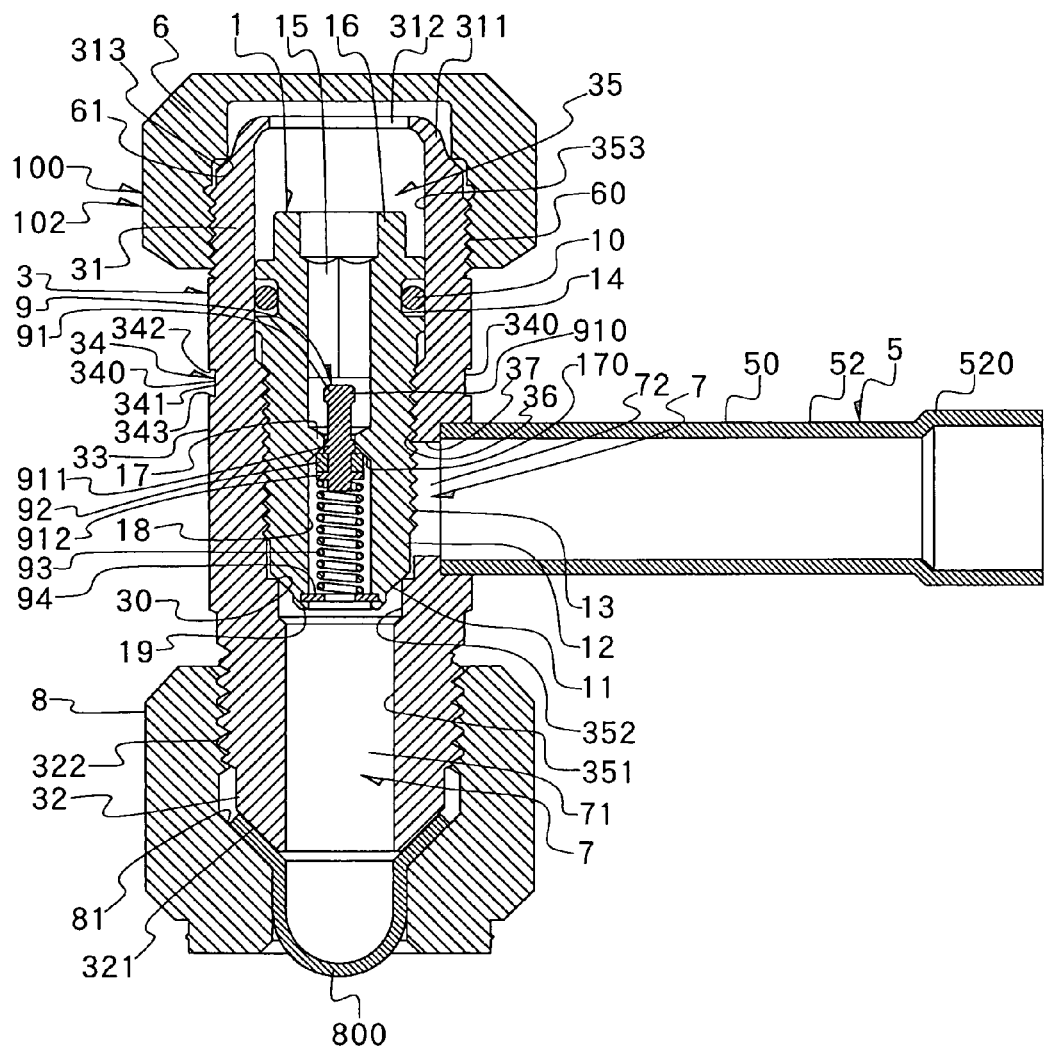
FIG. 4 is a sectional view of a gas-side valve in the state of being closed.

As shown in FIG. 4, the valve body 3 of the gas-side valve 102 has an appearance in the slightly larger pencil-shaped form. Fixed to laterally of the non-round trunk part 33 by means of brazing or the like is a pipe joint 520 which is a component part for a gas piping 52 serving as the internal piping 5. Assembled inside the valve spindle 1 is a service valve mechanism 9 which is to be made use of during air purge upon installation or during service working such as additionally filling refrigerant, etc. At the rear end of the valve spindle 1 serving as a receiving side for a service work jig, an extended cylinder 16 is integrally formed in continuation to the insertion hole 15 for the operation tool. Provided below the insertion hole 15 are a pin hole 17 smaller in diameter than the insertion hole 15, and a communication hole 18 extending through to the lower end of the valve spindle 1.

The service valve mechanism 9 is provided with: a service valve core 91 in a pin-shaped form to be inserted into the pin hole 17; an annular seat 92 made of resin to always seal the side of the communication hole 18 against the side of the insertion hole 15; a coiled spring 93 which urges the valve core 91 in the direction of moving upwards to press the annular seat 92 against a tapered surface 170 below the pin hole 17; and a spring shoe 94 for receiving a lower end of the coiled spring 93. The valve core 91 is integrally provided: at its upper part with a jig holder 910; at the middle part with a guide 911 which slides in the pin hole 17; and at the lower part with a flange 912 which receives a lower end of the annular seat 92 and an upper end of the coiled spring 93. The spring shoe 94 has a central hole and is held at the outer peripheral part by a caulked part 19 at the tip of the valve head 11.

Figure 5:
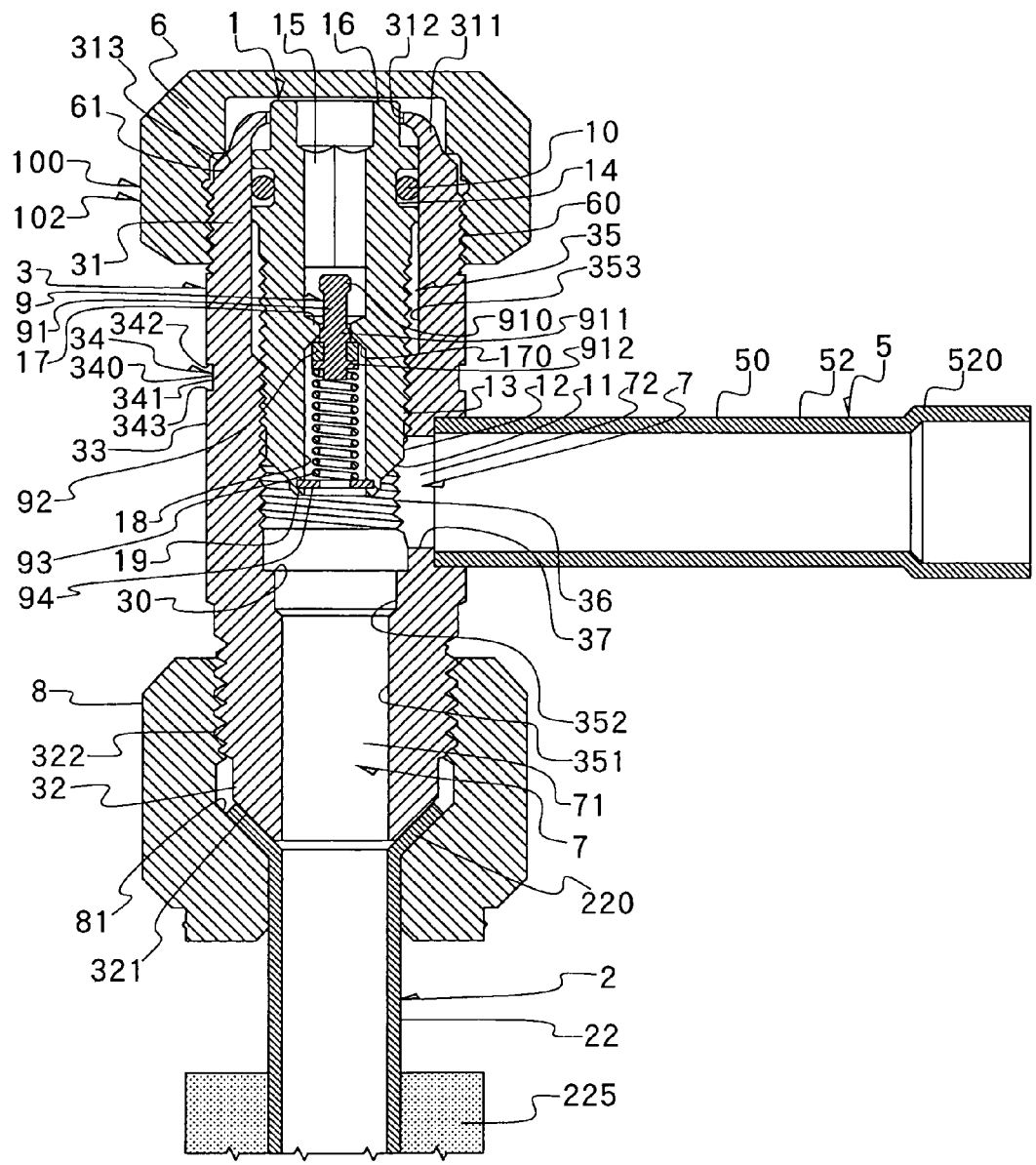
FIG. 5 is a sectional view of a gas-side valve in the state of being opened.

As shown in FIG. 5, after installation, onto the tapered surface part 321 of the connection tool mounting part 32 is press-contact a flare part 220 of a gas-side piping 22 serving as an external piping 2. Air purge is carried out in such manner that in the state of the liquid-side valve 101 and the gas-side valve 102 each being closed with the valve spindles 1 having been not yet moved up, the service work jig (connected to one end of the charge hose of the gauge manifold connected to the vacuum pump) is inserted into the insertion hole 15, the valve core 91 is pressed down to connect the external piping-side passage 71, in turn, the external piping 2 (21, 22) to the vacuum pump, followed by creating a vacuum. In case of a particular circumstance, such as elongation of the external piping 2 (21, 22), working for additionally filling refrigerant when required is carried out following air purge. After air purge, the valves 101, 102 are caused to be open. For the gas-side valve 102, the valve lid 6 is put thereon with the valve spindle 1 being left away from the valve seat 30 to cause the extended cylinder 16 to project upwards a little from the upper end of the fall prevention bent part 311. Reference numeral 225 denotes a heat insulating material wound onto the gas-side piping 22. Specific structures of the gas-side valve 102 except that as above-mentioned are the same as the liquid-side valve 101.

EXAMPLE 1

Figure 6:
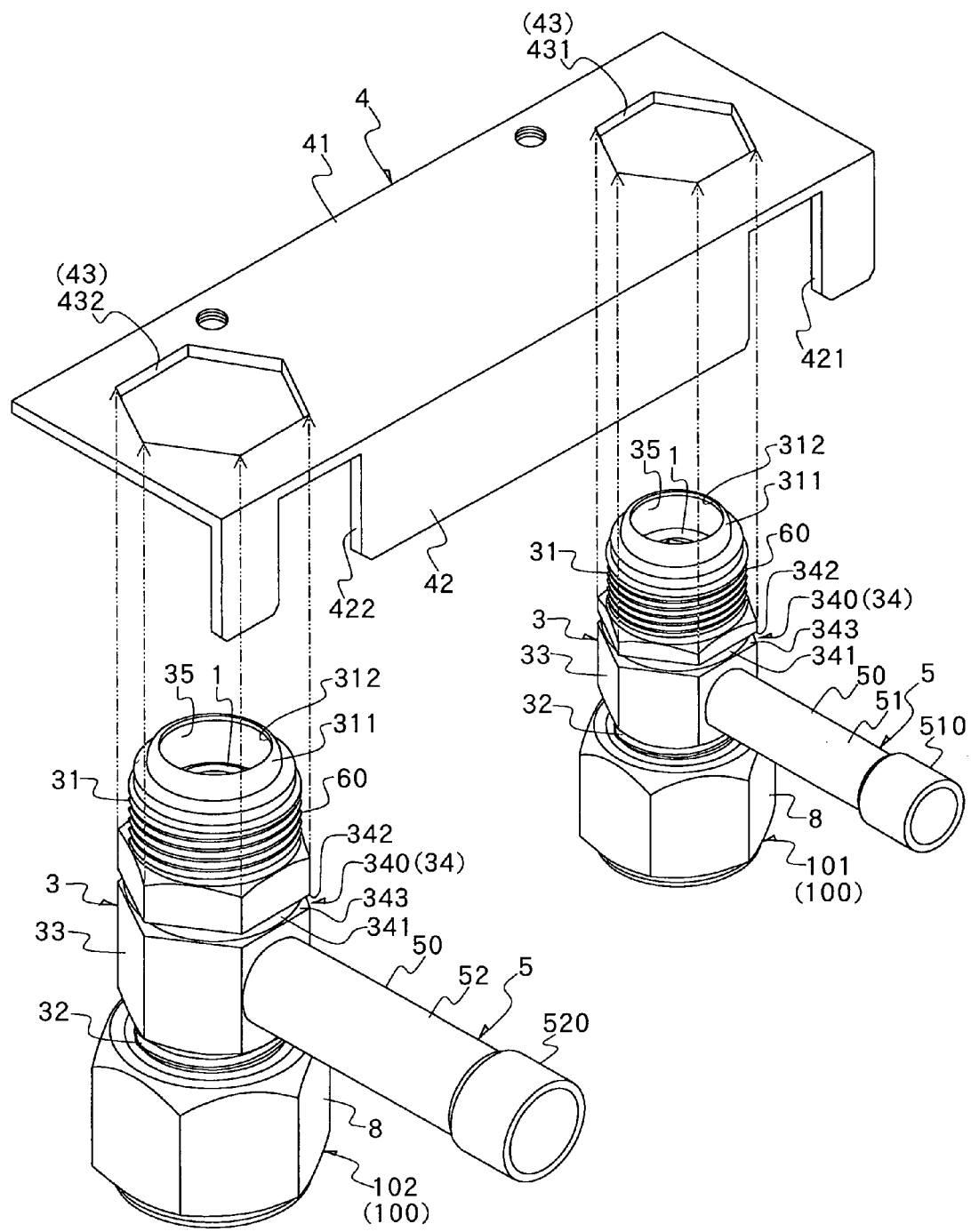
FIG. 6 is a first assembly diagram of Example 1.

As shown in FIG. 6, a support member 4 to be fixed to the outdoor unit frame 400 is in a L-like shape formed by a plane plate 41 and a side plate 42 perpendicular to the plane plate 41. The plane plate 41 is provided with a trunk part engaging section 43 comprising a smaller equilateral hexagonal hole 431 (which contacts and engages, wholly circumferentially, with the non-round trunk part 33 of the liquid-side valve 101 to restrict or prevent the valve body 3 from turning and shifting in position), and further provided with a trunk part engaging section 43 comprising a larger equilateral hexagonal hole 432 (which contacts and engages, wholly circumferentially, with the non-round trunk part 33 of the gas-side valve 102 to restrict or prevent the valve body 3 from turning and shifting in position). The sideplate 42 has cutouts 421, 422 for inserting the pipe joints 510, 520.

Figure 7:
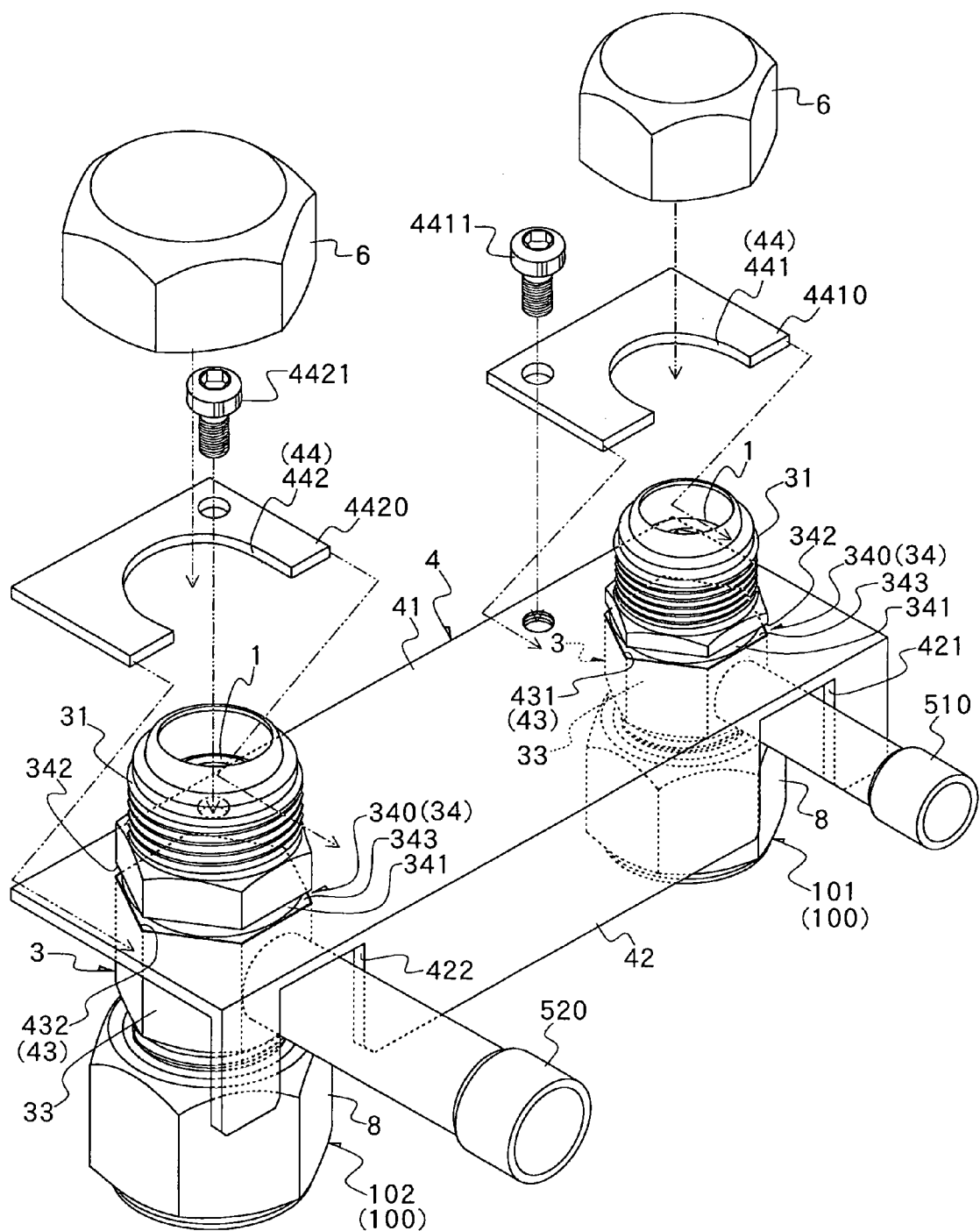
FIG. 7 is a second assembly diagram of Example 1.

As shown in FIG. 7, in the state that the non-round trunk parts 33 are brought into engagement with the trunk part engaging sections 43, the annular grooves 340 forming the recessed parts 34 just appear on the surface of the plane plate 41, and the lower side wall 343 and the surface of the plane plate 41 are on the same plane. Mounted by use of a screw 4411 to the plane plate 41 is a first plate segment 4410 provided with a recessed part engaging section 44 consisting of a semi-circular cutout 441 which projects, to an extent of more than half the periphery (Note: the projecting in an extra extent exceeding the extent of half the periphery is performed by the linear parts of the plate segments of the engaging section 44. The foregoing wordings "- - - projects (into - - - ), to an extent of more than half the periphery - - - " when repeated hereunder will have the same meaning as described here.), into the annular groove 340 of the liquid-side valve 101. Similarly, mounted by use of a screw 4421 to the plane plate 41 is a second plate segment 4420 provided with a recessed part engaging section 44 consisting of a semi-circular cutout 442 which projects, to an extent of more than half the periphery, into the annular groove 340 of the gas-side valve 102. Thickness of the plate segments 4410, 4420 is in the size to be just fit between the groove side walls 342 and 343 of the annular groove 340.

Figure 8:
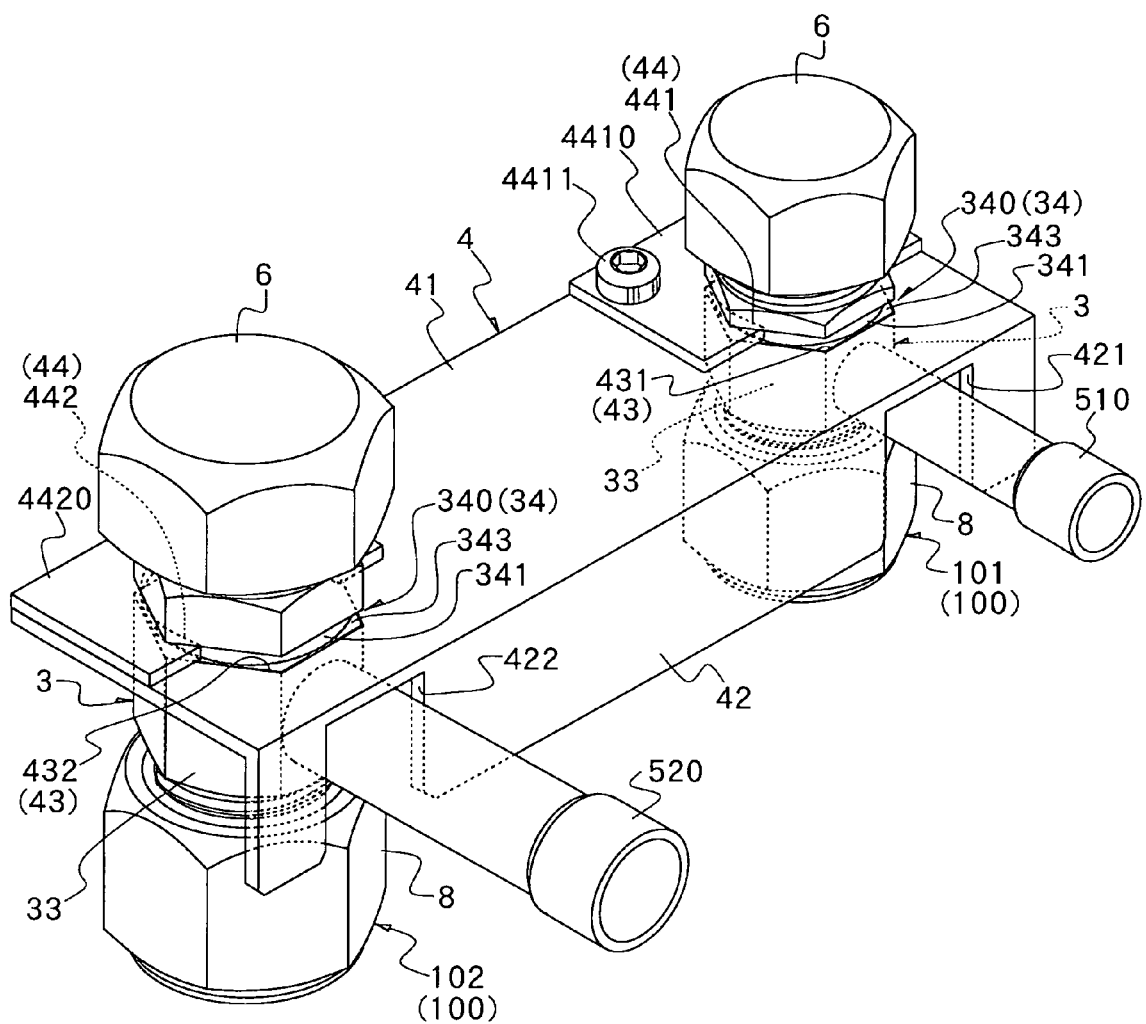
FIG. 8 is a completion diagram of Example 1.

As shown in FIG. 8, in the state that the valves 101 and 102 are supported by the support member 4, and, during assembling the valves 101 and 102 to the support member 4 until achievement of that supporting state, an unreasonable foreign force is not applied to the valve bodies 3, whereby a bad influence from strain or distortion of materials arising from the supporting can be eliminated. The valves 101 and 102 can be kept for a long term in an excellent supporting state with the valve bodies 3 being effectively restricted or prevented from not only turning to shift in position but also moving to shift in axial position thanks to engagement between the non-round trunk part 33 and the trunk part engaging section 43, and, that between the recessed part 34 and the recessed part engaging section 44.

EXAMPLE 2

Figure 9:
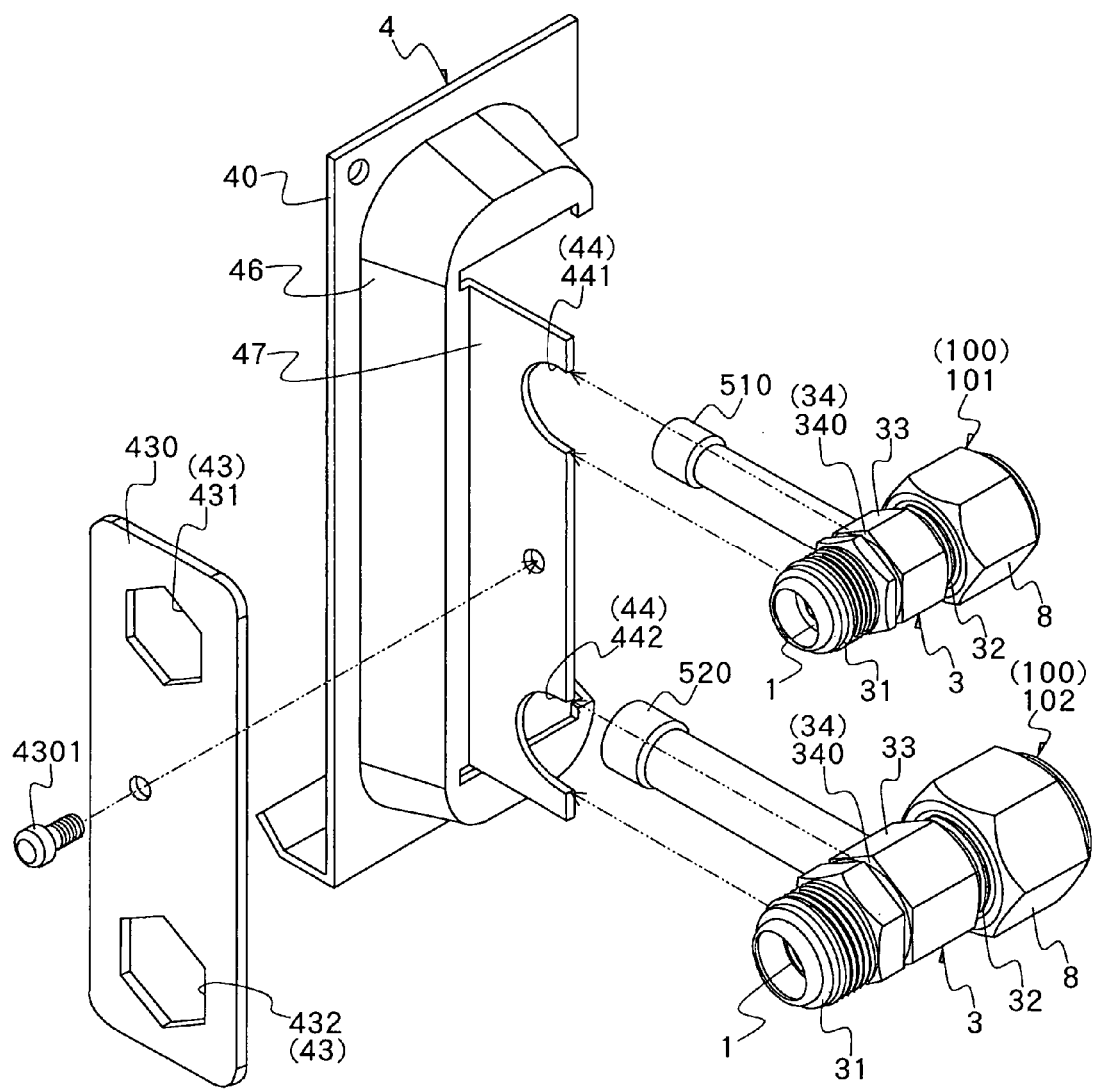
FIG. 9 is an assembly diagram of Example 2.
Figure 10:
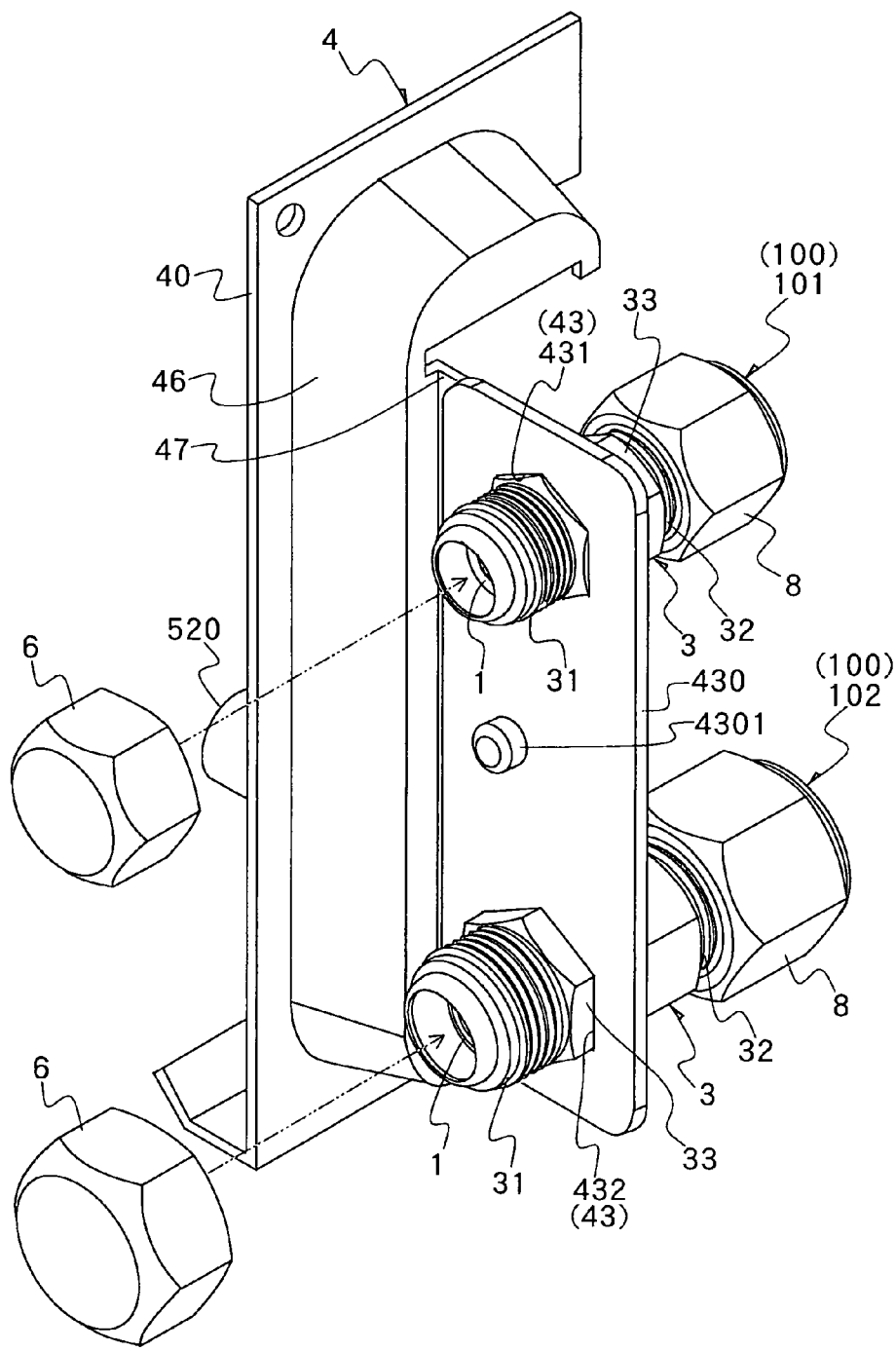
FIG. 10 is a completion diagram of Example 2.

As shown in FIGS. 9 and 10, the support member 4 comprises a base plate 40 provided integrally with a swollen part 46 and a rising plate 47. The rising plate 47 is provided with a recessed part engaging section 44 consisting of a semi-circular cutout 441 which projects, to an extent of more than half the periphery, into the annular groove 340 of the liquid-side valve 101, and also provided with a recessed part engaging section 44 consisting of a semi-circular cutout 442 which projects, to an extent of more than half the periphery, into the annular groove 340 of the gas-side valve 102. A plane plate segment 430 to be tightened to the rising plate 47 by use of a screw 4301 is provided with a trunk part engaging section 43 comprising a smaller equilateral hexagonal hole 431 (which contacts and engages, wholly circumferentially, with the non-round trunk part 33 of the liquid-side valve 101 to restrict or prevent the valve body 3 from turning and shifting in position), and further provided with a trunk part engaging section 43 comprising a larger equilateral hexagonal hole 432 (which contacts and engages, wholly circumferentially, with the non-round trunk part 33 of the gas-side valve 102 to restrict or prevent the valve body 3 from turning and shifting in position).

EXAMPLE 3

Figure 11:
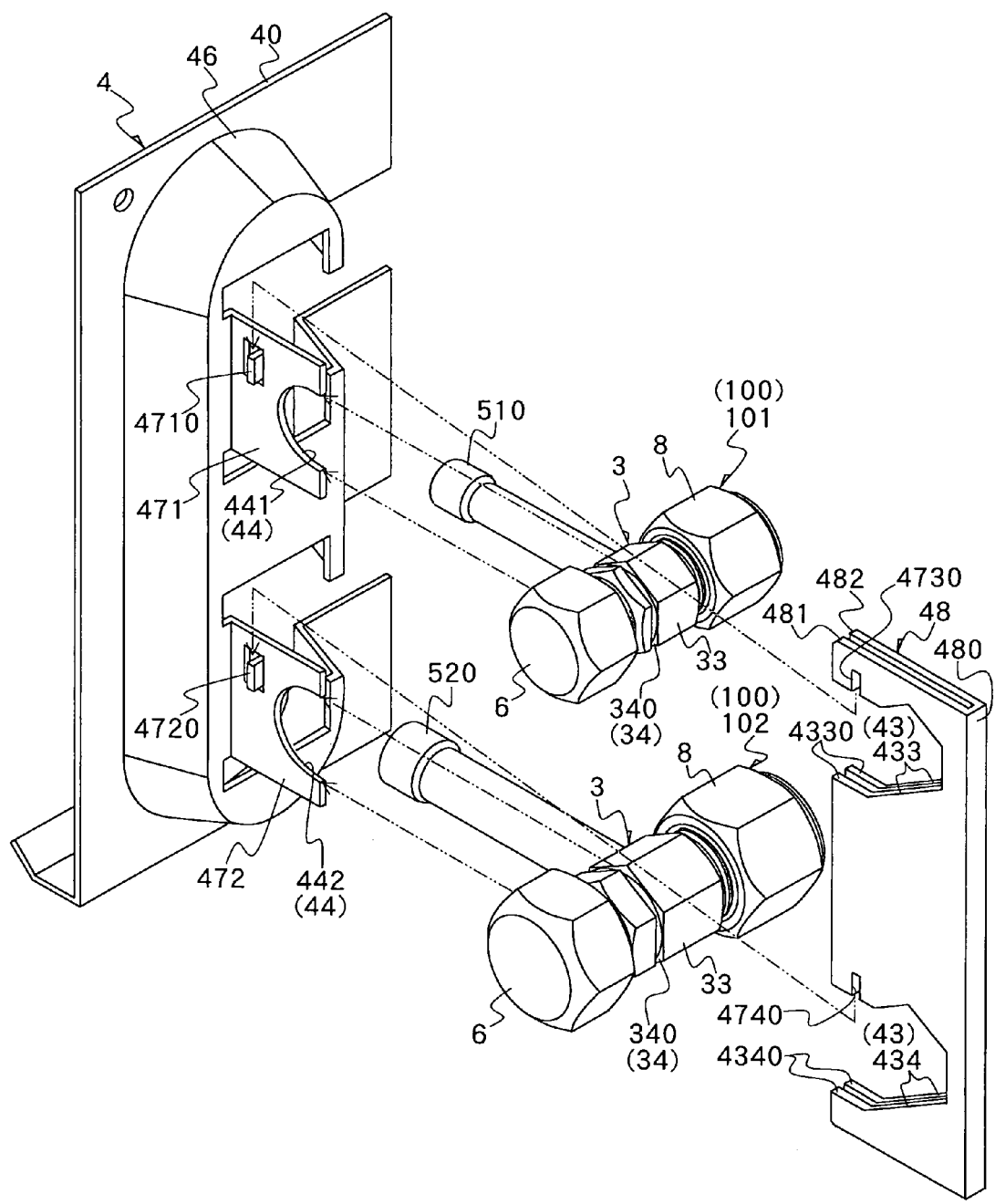
FIG. 11 is an assembly diagram of Example 3.
Figure 12:
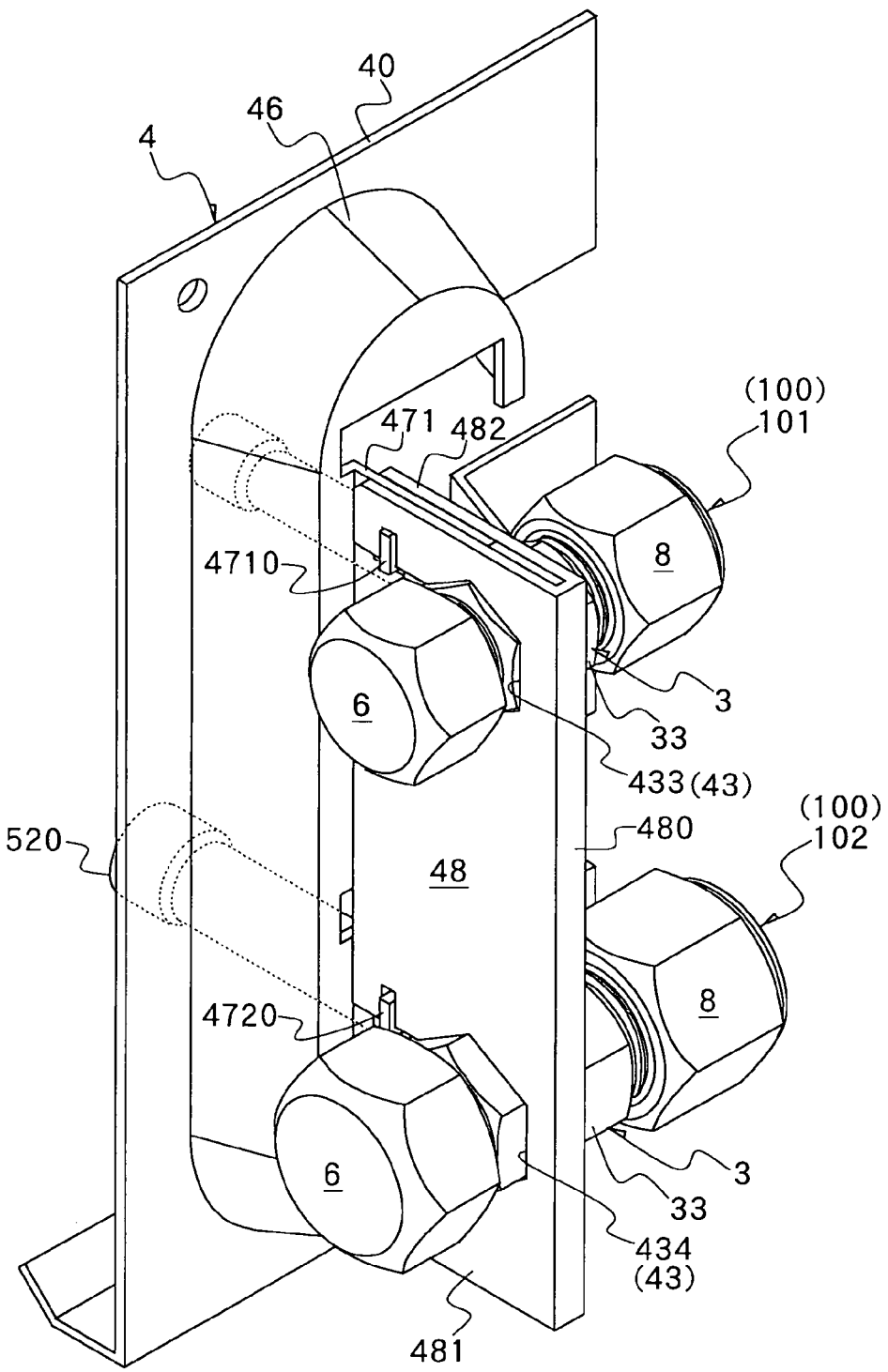
FIG. 12 is a completion diagram of Example 3.

As shown in FIGS. 11 and 12, the swollen part 46 on the support member 4 is provided with a first rising plate 471 and a second rising plate 472 each separately supporting the valves 101 and 102, respectively. The rising plates 471 and 472 are each provided with a recessed part engaging section 44 consisting of a semi-circular cutout 441 and 442 which projects, to an extent of more than half the periphery, into the annular groove 340, and further provided with a catch 4710, 4720 formed by cutting and bending up a part of the rising plate. There is formed a fitting member 48 which consists of a front plate 481 and a rear plate 482 folded at a folding section 480 and sandwiches the rising plates 471 and 472 between the front and rear plates. The front and rear plates 981, 482 are provided with a trunk part engaging section 43 which comprises an insertion guide 4330, 4340 having a slightly larger frontage or width and double cutouts 433, 434 continuing to the insertion guide and contacting and engaging with the non-round trunk parts 33 of the valves 101, 102 at their four lateral sides. The front plate 481 of the fitting member 48 has a pawl 4730, 4740 to be caught by the catches 4710, 4720. This feature in the Example enables achievement of the supporting of the valves with one-touch insertion of the fitting member 48.

EXAMPLE 4

Figure 13:
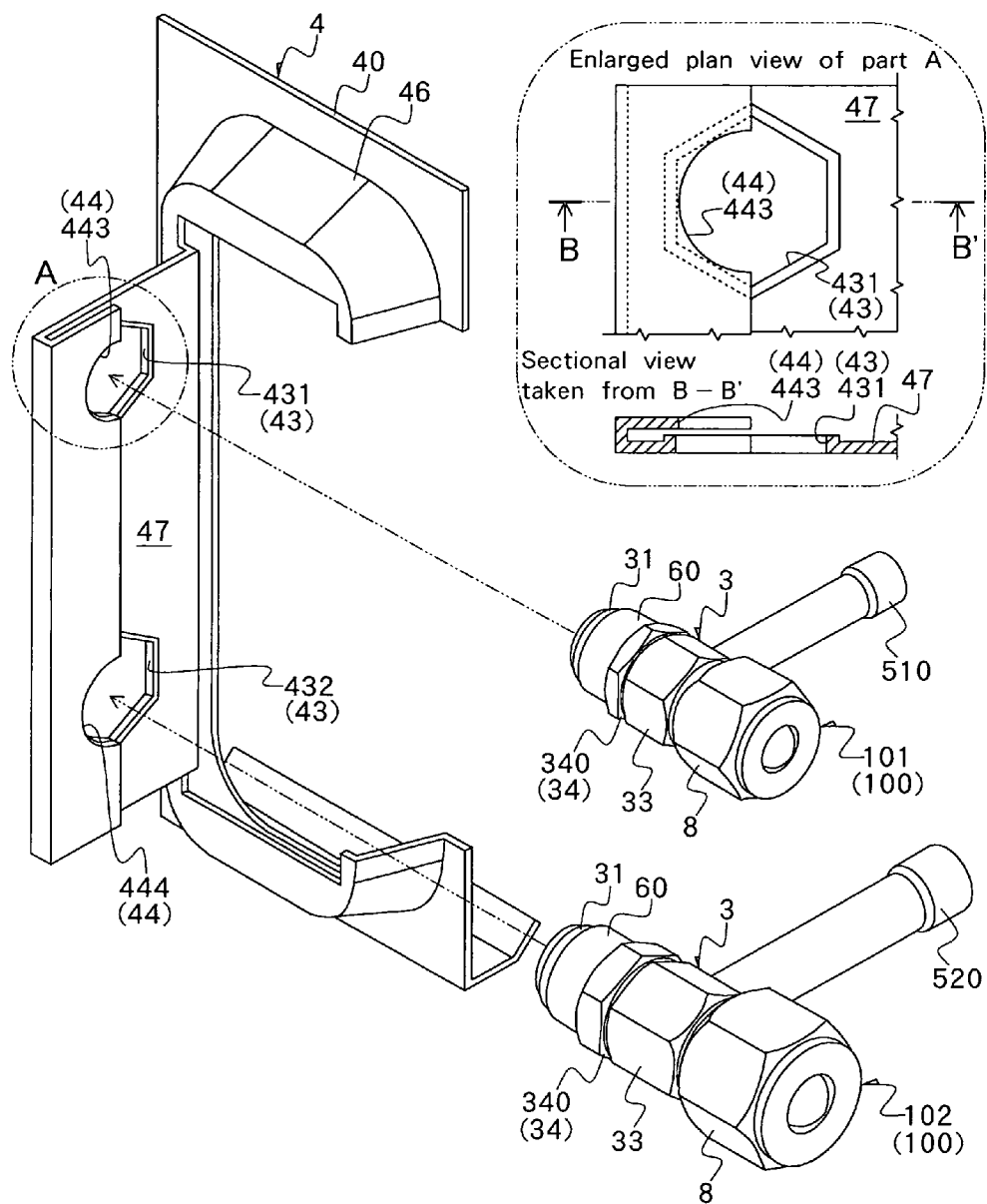
FIG. 13 is an assembly diagram of Example 4.
Figure 14:
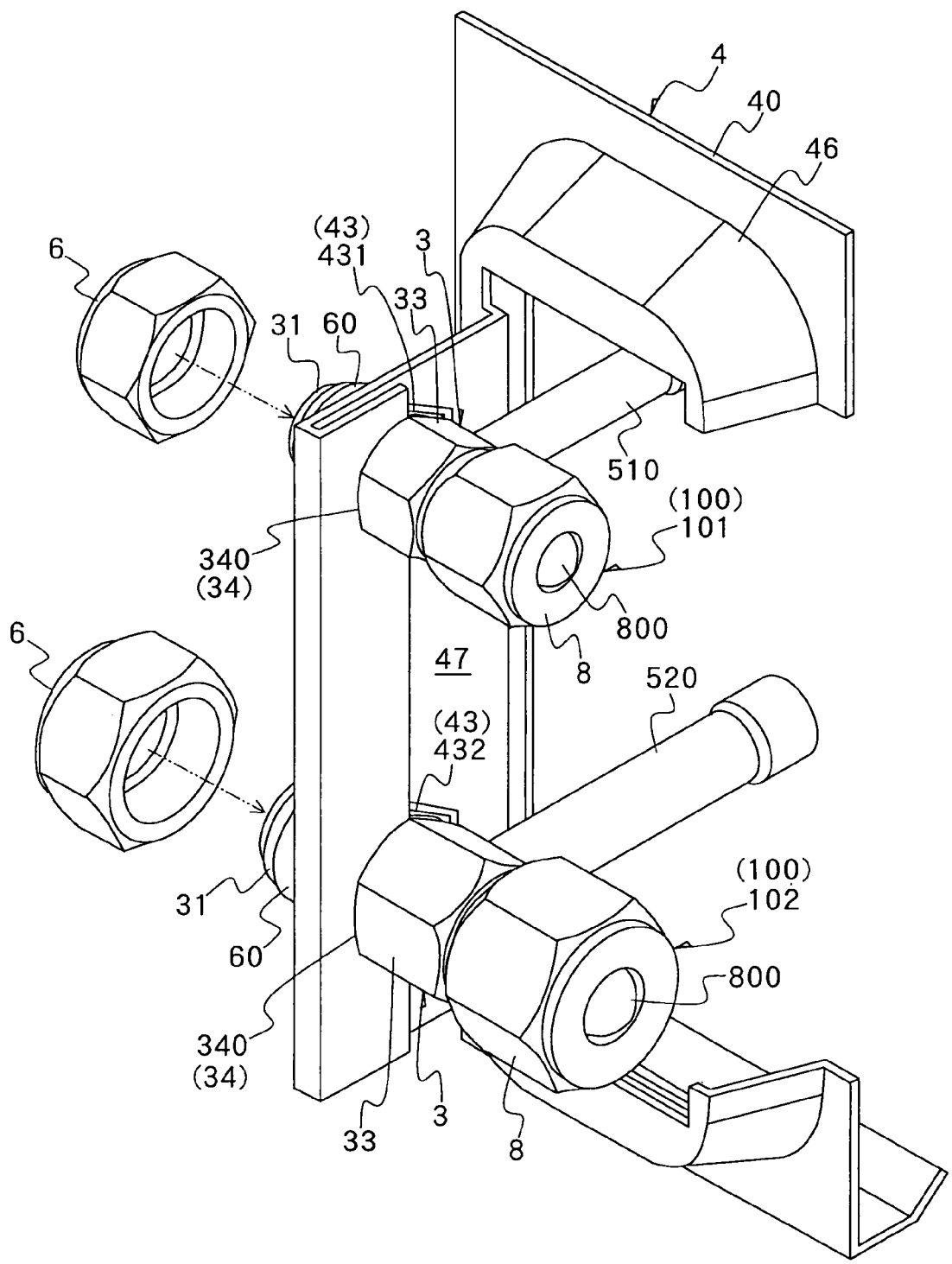
FIG. 14 is a completion diagram of Example 4.

As shown in FIGS. 13 and 14, the rising plate 47 has a folded structure in which a first plane is provided with a trunk part engaging section 43 comprising equilateral hexagonal holes 431, 432 provided with "flanging" corresponding to the non-round trunk parts 33, and, a folded plane is provided with a recessed part engaging section 44 comprising a semi-circular cutouts 443, 444 which engages with the annular grooves 340 to an extent of just half the periphery. The valves 101, 102 with the valve lid 6 being removed are pushed into the rising plate 47 from the side of the folded plane to thereby be supported there.

EXAMPLE 5

Figure 15:
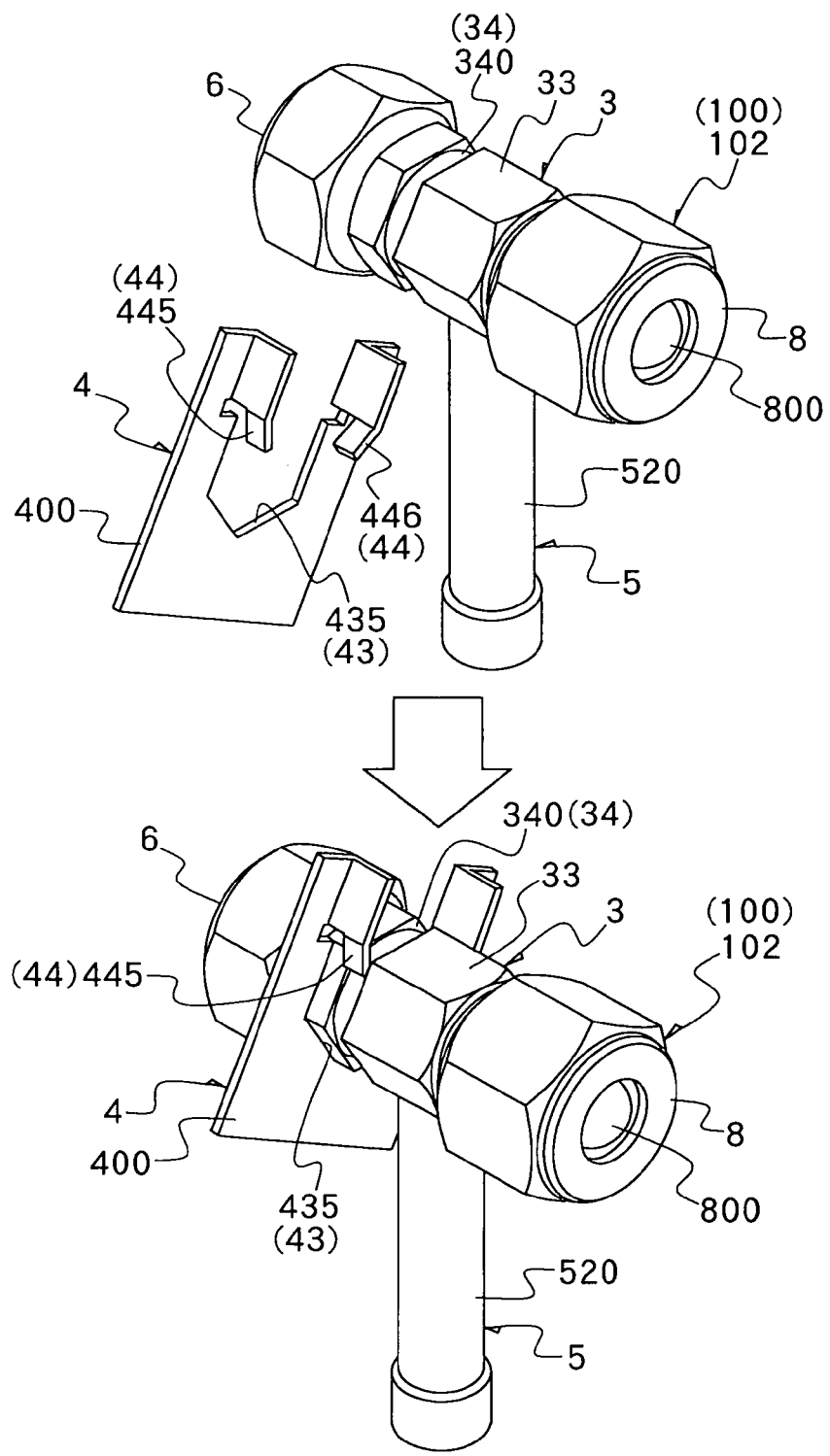
FIG. 15 is an assembly and completion diagram of Example 5.

As shown in FIG. 15, a separate rising plate 400 of the support member 4 is provided with: a trunk part engaging section 43 comprising an open type polygonal hole 435 which contacts and engages with the non-round trunk part 33 at its four lateral sides; and a recessed part engaging section 44 comprising a pair of folded pawls 445, 446 which project into the annular groove 340 at two points at the open side of the polygonal hole 435, whereby enabling the supporting of the valves by use of a simplest supporting structure. Illustrated in the drawing is only the gas-side valve 102 while the liquid-side valve 101 has the same structure and function as of the gas-side valve 102.

EXAMPLE 6

Figure 16:
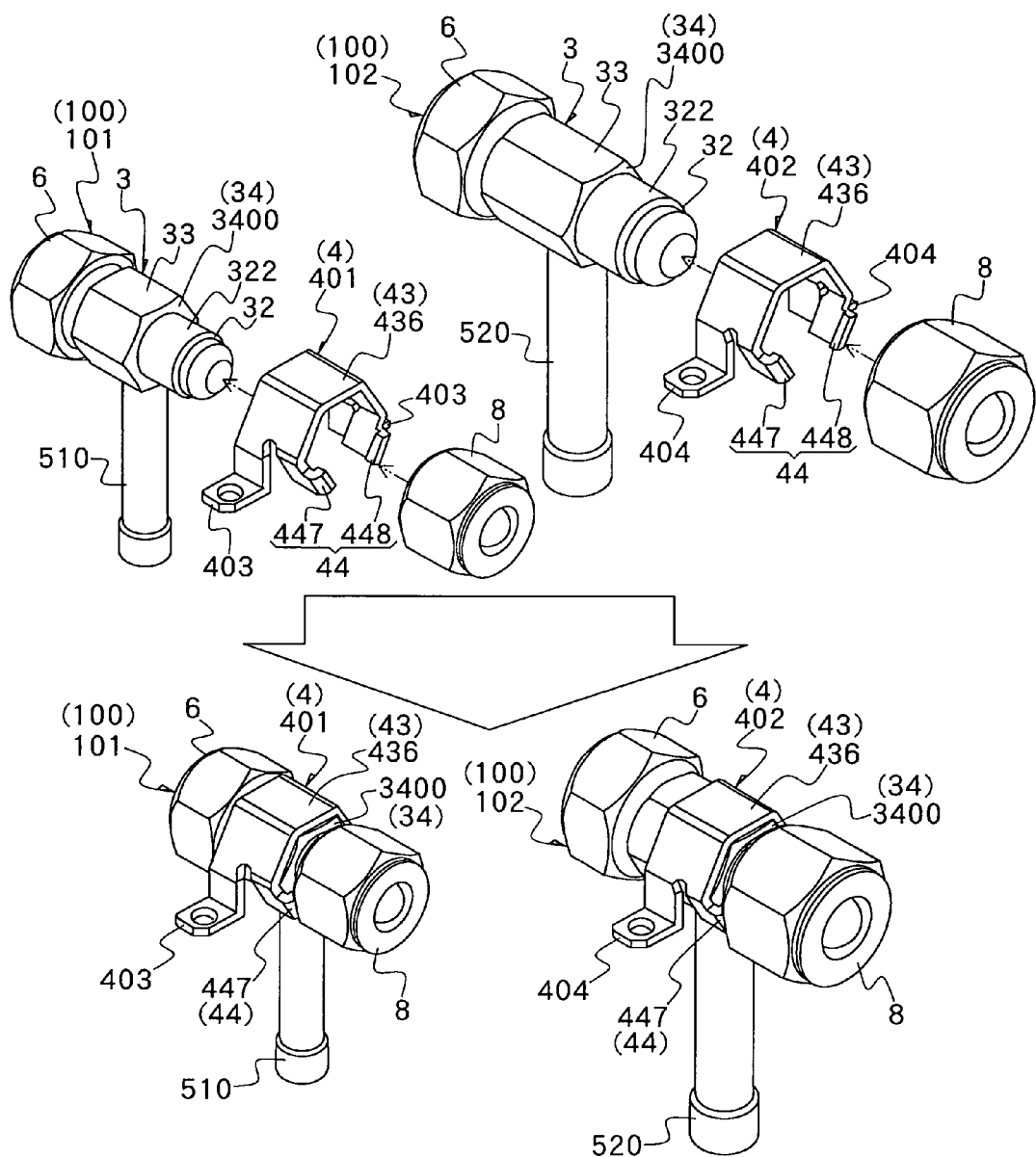
FIG. 16 is an assembly and completion diagram of Example 6.

As seen in FIG. 16, the non-round trunk part 33 of the valve body 3 is not provided with an annular groove 340. A stepped part 3400 between the non-round trunk part 33 and a connection tool mounting part 32 is made use of as a recessed part 34. The support member 4 comprises a separate holder 401, 402 formed by bending sheet metal. The holders 401, 402 is provided with: a trunk part engaging section 43 comprising a trunk winding part 436 which contacts and engages with the non-round trunk part 33 at five lateral sides; and a recessed part engaging section 44 comprising a pair of folded pawls 447, 448 which project into the stepped part 3400 at two points at the lower part of the trunk winding part 436. The folded pawls 447, 448 are interposed between the stepped part 3400 and the connection tool 8 to restrict or prevent the valve body 3 from shifting in position in the axial direction. The holders 401 and 402 are fixed, by screws through a pair of left and right-hand support legs 403, 404, to the outdoor unit frame 400.

EXAMPLE 7

Figure 17:
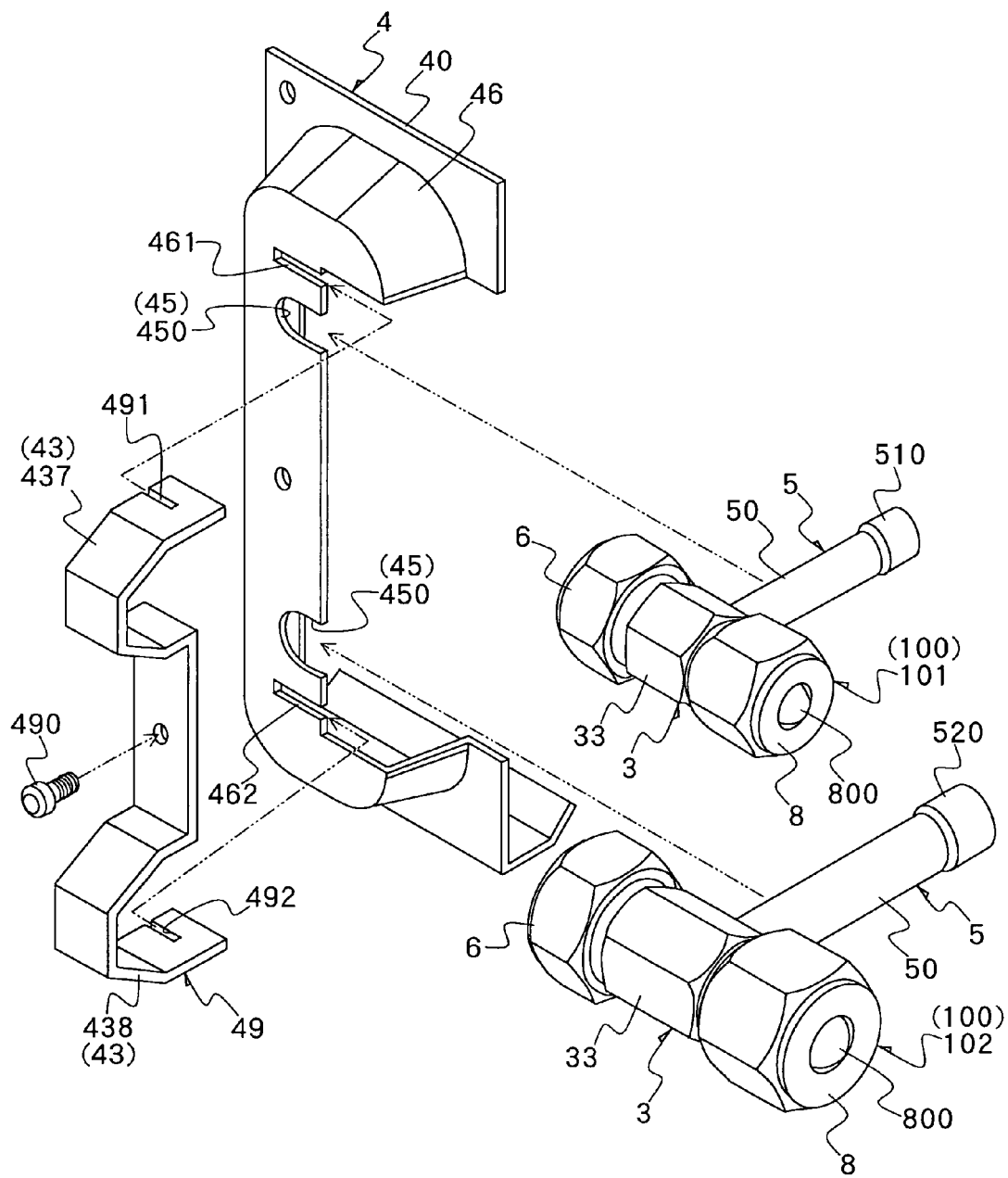
FIG. 17 is an assembly diagram of Example 7.
Figure 18:
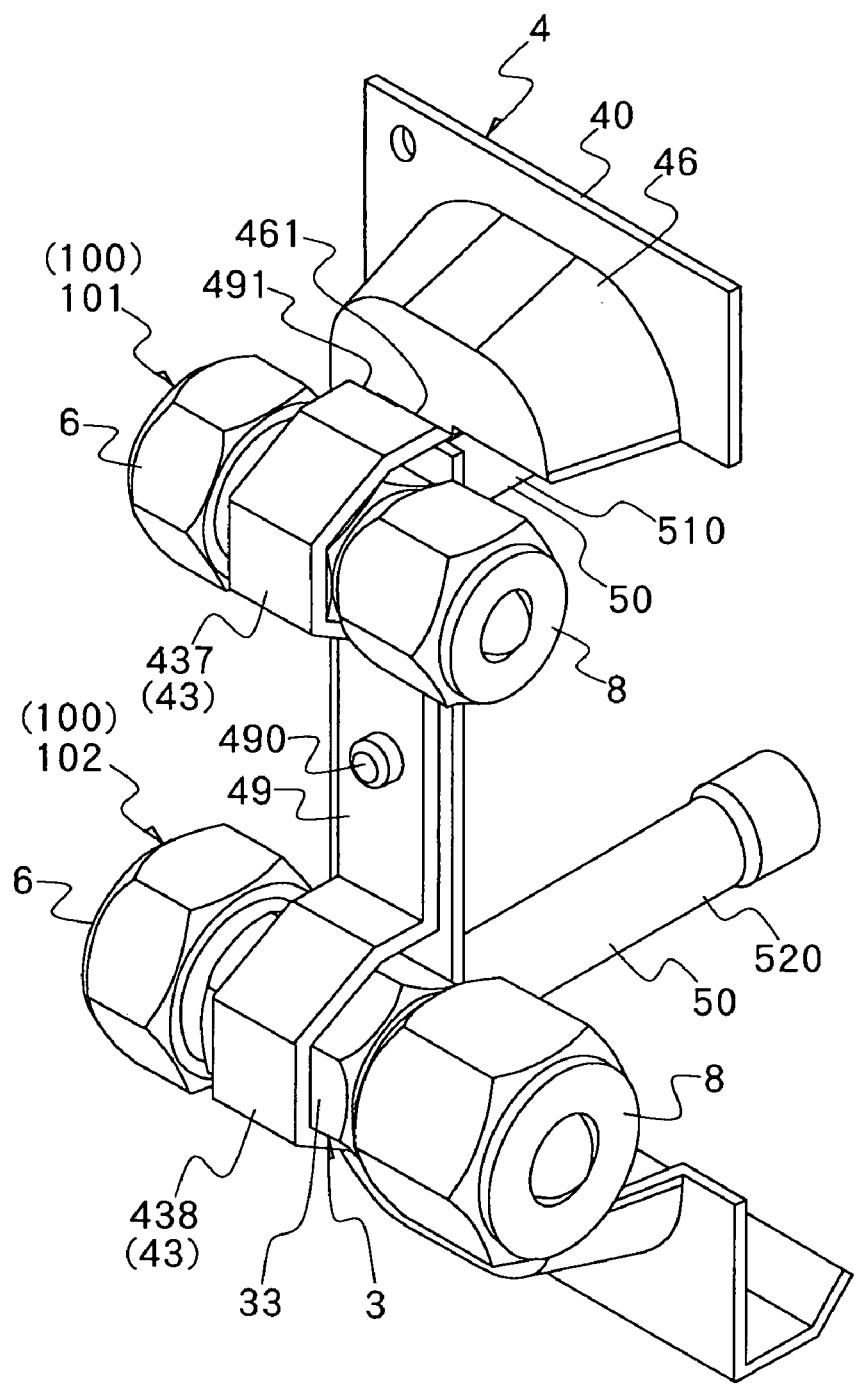
FIG. 18 is a completion diagram of Example 7.

As shown in FIGS. 17 and 18, in place of engagement between the recessed part 34 and the recessed part engaging section 44, engagement of a projecting part 50 (projecting from the outside surface of the non-round trunk part 33) with a projecting part engaging section 45 at the side of the support member 4 is made use of to restrict or prevent the valve body 3 from shifting in position in the axial direction. The projecting part 50 employs pipe joints 510, 520 constituting the internal piping 5. The projecting part engaging section 45 comprises a piping holder 450 in the form of a slit which receives the pipe joints 510, 520 and contacts with the outer periphery of the pipe joints. The projecting part engaging section 45 is provided, in the form of a cutout, at a plane of a swollen part 46 on the support member 4. One lateral side surface among six lateral side surfaces of the non-round trunk part 33 at which the pipe joint 510, 520 is fixed is put on the plane of the swollen part 46. There is formed a clamp 49 comprising a trunk winding part 437, 438 which contacts and engages with total three lateral side surfaces including a lateral side surface opposite to the foregoing one lateral side surface put on the plane of the swollen part 46, and two lateral side surfaces adjoining to the same, thereby serving as a trunk part engaging section 43. A cut 491 and 492 at both ends of the clamp 49 is inserted into a corresponding cut 461, 462 at the swollen part 46, and the clamp 49 is tightened at its central part to the swollen part 46 by means of a screw 490. The clamp 49 is fixed to the swollen part 46 in such manner of leaf spring's bending, thereby holding the valve body 3 as embracing or enveloping the same.

EXAMPLE 8

Figure 19:
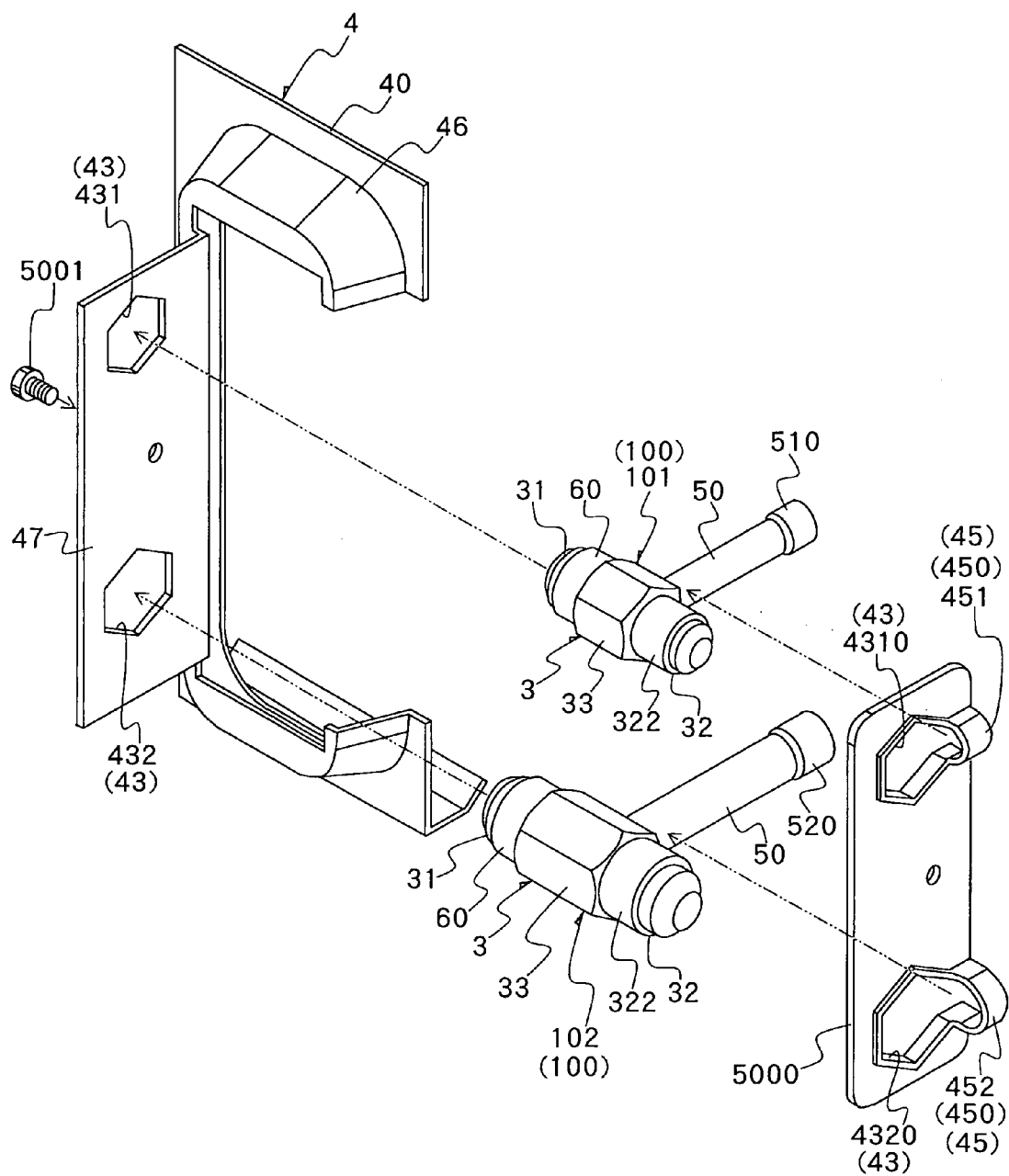
FIG. 19 is an assembly diagram of Example 8.
Figure 20:
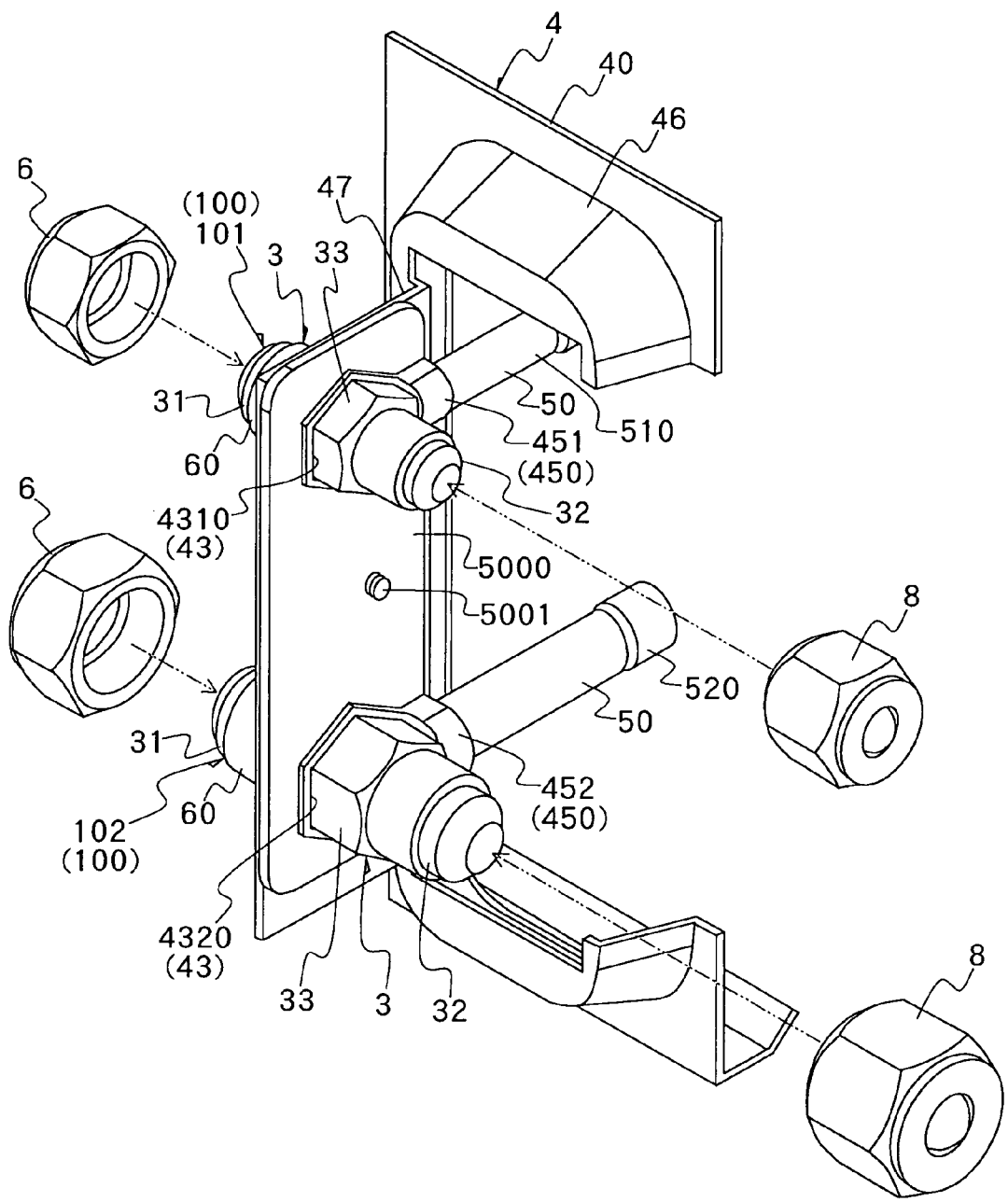
FIG. 20 is a completion diagram of Example 8.

As shown in FIGS. 19 and 20, a rising plate 47 of the support member 4 is provided with a trunk part engaging section 43 comprising equilateral hexagonal holes 431, 432. Tightened on the rear surface of the rising plate 47 by use of a screw 5001 is a worked plate 5000 which is provided with a polygonal hole 4310, 4320 having "flanging" and constituting a trunk part engaging section 43, for assistance, and also provided with a piping holder 450 comprising U-like shaped supporters 451, 452 which contacts, arcuately in a predetermined length, with the outer peripheries of the pipe joints 510, 520. The U-like shaped supporters 451, 452 may be provided at the side of the rising plate 47, or provided at both of the rising plate 47 and the worked plate 5000.

What we claimed is:

1. A valve device comprising: a valve spindle to be moved forward and backward by a turning operation; a valve body in a cylindrical shape being provided inside with a passage for refrigerant which passage is to be opened and closed by forward and backward movement of the valve spindle; and a support member for supporting the valve body, wherein the valve body is provided at its one side in the axial direction of the cylindrical shape with an operation tool receiving part for receiving the operation tool which turns the valve spindle, the valve body further provided at the other side in the axial direction with a connection tool mounting part for mounting a connection tool by which an external piping is attached and detached;

between the operation tool receiving part and the connection tool mounting part of the valve body are provided a non-round trunk part having a cross-section of a non-round shape, and a recessed part concaved from the outside surface of the trunk part; and the support member consists of a trunk part engaging section, which engages with the non-round trunk part to restrict or prevent the valve body from turning and shifting in position, and a recessed part engaging section which engages with the recessed part to restrict or prevent the valve body from axially shifting in position.

2. A valve device as set forth in claim 1 wherein the recessed part comprises an annular groove which has a groove bottom equidistant from the axis of the cylindrical shape of the valve body and a pair of groove side walls extending inwardly from the outside surface of the non-round trunk part.

3. A valve device comprising: a valve spindle to be moved forward and backward by a turning operation; a valve body in a cylindrical shape being provided inside with a passage for refrigerant which passage is to be opened and closed by forward and backward movement of the valve spindle; and a support member for supporting the valve body, wherein the valve body is provided at its one side in the axial direction of the cylindrical shape with an operation tool receiving part for receiving the operation tool which turns the valve spindle, the valve body further provided at the other side in the axial direction with a connection tool mounting part for mounting a connection tool by which an external piping is attached and detached;

between the operation tool receiving part and the connection tool mounting part of the valve body are provided a non-round trunk part having a cross-section of a non-round shape, and a projecting part projecting from the outside surface of the trunk part; and the support member consists of a trunk part engaging section, which engages with the non-round trunk part to restrict or prevent the valve body from turning and shifting in position, and a projecting part engaging section which engages with the projecting part to restrict or prevent the valve body from axially shifting in position.

4. A valve device as set forth in claim 3 wherein the projecting part comprises an internal piping fixed laterally to the non-round trunk part, and the projecting part engaging section comprises a piping holder which contacts with the outer periphery of the internal piping.

5. A valve device as set forth in claim 1 wherein the valve body is made of a cut work from a bar-shaped material.

6. A valve device as set forth in claim 2 wherein the valve body is made of a cut work from a bar-shaped material.

7. A valve device as set forth in claim 3 wherein the valve body is made of a cut work from a bar-shaped material.

8. A valve device as set forth in claim 4 wherein the valve body is made of a cut work from a bar-shaped material.

* * * * *